United States Patent
Milam

[15] 3,643,635
[45] Feb. 22, 1972

[54] ELECTRONIC FUEL INJECTION SYSTEM

[72] Inventor: William T. Milam, 4501 Coltrane Road, Oklahoma City, Okla. 73121

[22] Filed: Apr. 24, 1970

[21] Appl. No.: 31,613

[52] U.S. Cl. .................................123/32 EA, 123/140.3
[51] Int. Cl. ..................................F02b 3/00, F02d 1/04
[58] Field of Search .................123/32 E, 32 EC, 140.3, 119, 123/139.17

[56] References Cited

UNITED STATES PATENTS

| | | | |
|---|---|---|---|
| 2,244,669 | 6/1941 | Becker | 123/140 |
| 2,511,213 | 6/1950 | Leslie | 123/139 |
| 2,687,123 | 8/1954 | Parsons | 123/139 |
| 2,859,738 | 11/1958 | Campbell | 123/32 |
| 2,876,755 | 3/1959 | Gold et al. | 123/140 |
| 2,914,050 | 11/1959 | Reggio | 123/140 |
| 2,941,519 | 6/1960 | Zechnall | 123/32 |
| 2,948,272 | 8/1960 | Woodward et al. | 123/32 |
| 3,036,564 | 5/1962 | Guiot | 123/32 |
| 3,051,152 | 8/1962 | Paule | 123/32 |
| 3,319,613 | 5/1967 | Begley | 123/32 |
| 2,959,920 | 11/1960 | Brandau | 60/39.28 |

FOREIGN PATENTS OR APPLICATIONS

| | | | |
|---|---|---|---|
| 936,945 | 4/1948 | France | 123/32 |

*Primary Examiner*—Mark M. Newman
*Assistant Examiner*—Ronald B. Cox
*Attorney*—Miller & Brown

[57] ABSTRACT

The invention is an electronic fuel injection system for use on internal combustion engines. The fuel is injected into the intake manifold by a variable flow positive displacement pump which varies the amount of fuel flow by varying the motor speed driving the pump. Sensing devices which sense the exhaust gas temperature, movement of the throttle and the r.p.m. of the fuel pump, continually feed signals to the electronic control unit which computes the proper pump speed for an optimum air-to-fuel ratio in accordance with the previously mentioned variable operating factors.

11 Claims, 4 Drawing Figures

INVENTOR.
WILLIAM T. MILAM

ELECTRONIC FUEL INJECTION SYSTEM

BACKGROUND OF THE INVENTION

The time-honored carburetor is fast becoming an outmoded method of supplying fuel and air to an automobile engine. The recent impetus has been caused by the awareness and concern for the environmental pollution caused by automobiles and trucks. While there are a variety of complex and expensive add-on devices for controlling the emission of exhaust contaminants in our present engines, their value is questionable. A simple answer for reducing exhaust contaminants, is to provide more complete combustion of the fuel by leaning the air-to-fuel ratio. Current carbureted automobiles operate at an air-fuel ratio of 14:1 and sometimes as rich as 9:1 while fuel injection systems can operate at substantially leaner ratios in the realm of 19:1. At such lean ratios the two major contaminants can be significantly reduced to levels acceptable to current proposed government standards.

Mechanical fuel injection systems, which have existed for many years, have not been used extensively because of their complexity and high cost. Only in recent years, due to the availability of solid-state electronics, have the electronic-controlled fuel injection systems been developed. Systems of this type, involve a group of sensors which relate to a computer, variables such as engine speed, temperature and manifold pressure. The computer or electronic control in turn computes the opening time for each injector and signals injectors to open momentarily and allow the proper amount of fuel under pressure to flow into the intake manifold adjacent each cylinder intake. The amount of fuel injected into each cylinder is varied by the time interval the injector remains open. A triggering system connected to the ignition distributor will inject, for example, four cylinders simultaneously in an eight cylinder engine. Injection of fuel for each four cylinder group begins when the first cylinder to fire, in the group of four, is starting its intake stroke. Such a triggering system adequately functions and is simpler than a sequential fully timed injection for each cylinder.

The present invention involves an electronic control unit which senses the exhaust gas temperature or EGT, the throttle movement and the r.p.m. of the fuel pump motor, and in turn regulates the amount of fuel injected into the intake manifold. Rather than electromagnetically operated injectors, the amount of fuel injected is metered by a variable volume fixed displacement pump which is powered by a variable speed motor. The electronic control causes an oscillator to vary the input power to the pump motor thereby metering the fuel being injected into the intake manifold. There is no triggering system to time the injections with the intake strokes since the fuel air flow is continuous.

It is therefore the primary object of the present invention to provide an electronic fuel injection system which optimizes the air-fuel ratio in relation with the exhaust gas temperature.

Another object of the present invention is to provide a new fuel injection system which minimizes the unburned exhaust emissions over the present carbureted systems.

A further object of the present invention is to provide a fuel delivery system that enables the engine to develop maximum power with minimum fuel demand.

Another object of the present invention is to provide a simplified fuel injection system which is virtually trouble-free in operation.

Still a further object of the present invention is to provide a continuous flow fuel injected system which provides a smooth engine performance with an optimum air-fuel ratio.

Another object of the present invention is to provide a fuel injection system which does not require a timed sequential injection for each cylinder.

A further object of the invention is to provide a system that can be readily adapted to existing carbureted engines.

The invention together with other objects will be more clearly understood when the following description is read in connection with the accompanying drawings in which.

Figure 1:
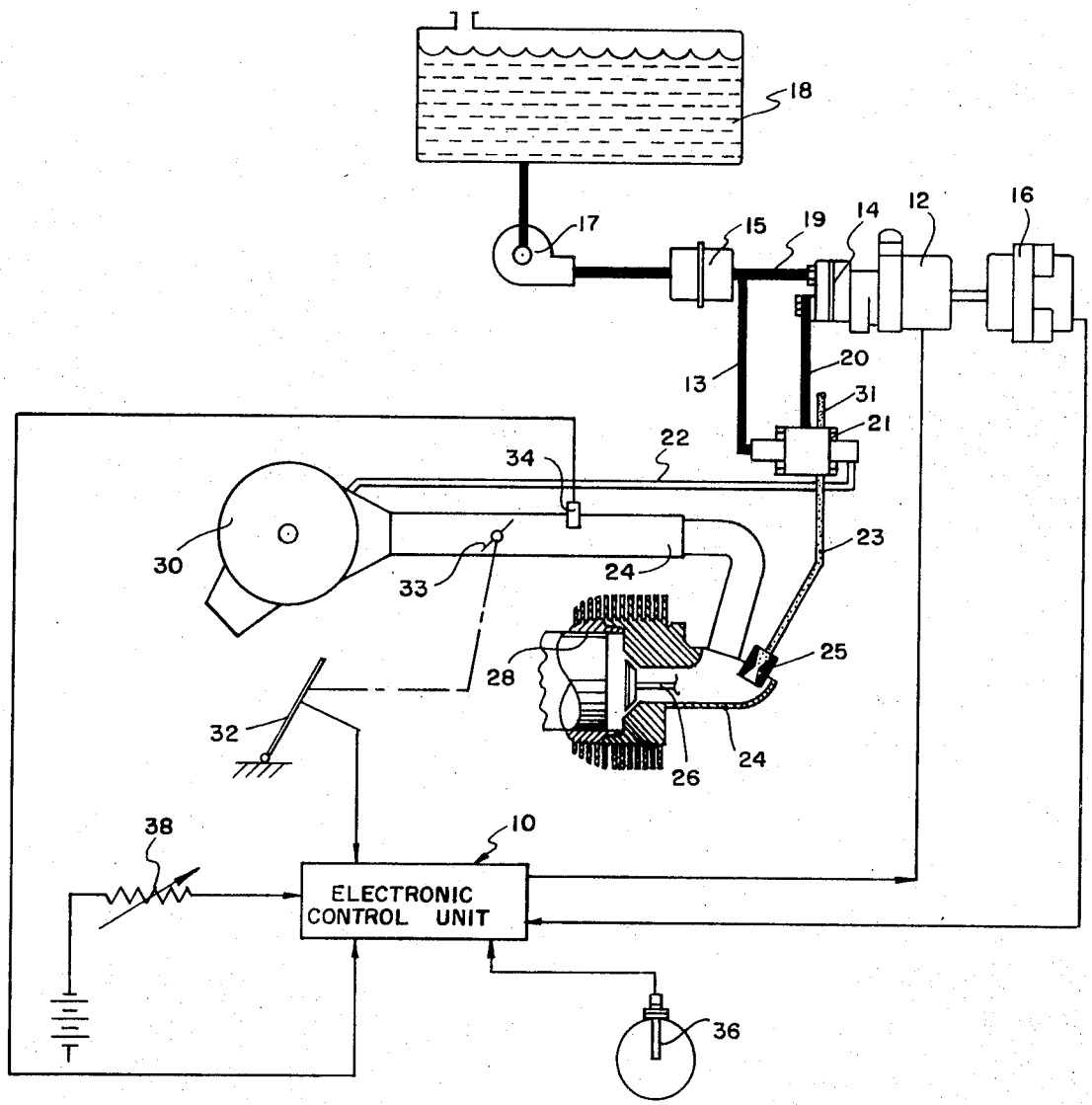
FIG. 1 is a diagrammatic view of the fuel injection system of the present invention as utilized on a conventional automobile engine.

Referring now to FIG. 1 of the drawing, the electronic control unit which controls the fuel injection system is generally identified by reference numeral 10. The control unit 10 supplies current to the DC motor 12, which in turn drives the gear pump 14. Directly connected to motor 12 is a tachometer-generator 16 which supplies a feedback signal to the control unit 10 indicating the speed of the pump. The pump 14 is supplied through its inlet line 19, with constant low-pressure fuel by a centrifugal or other type pump 17 which draws fuel from tank 18. Located in line 19 is a filter 15 and a pressure-sensing line 13 branching off to the mixing valve 21.

Figure 4:
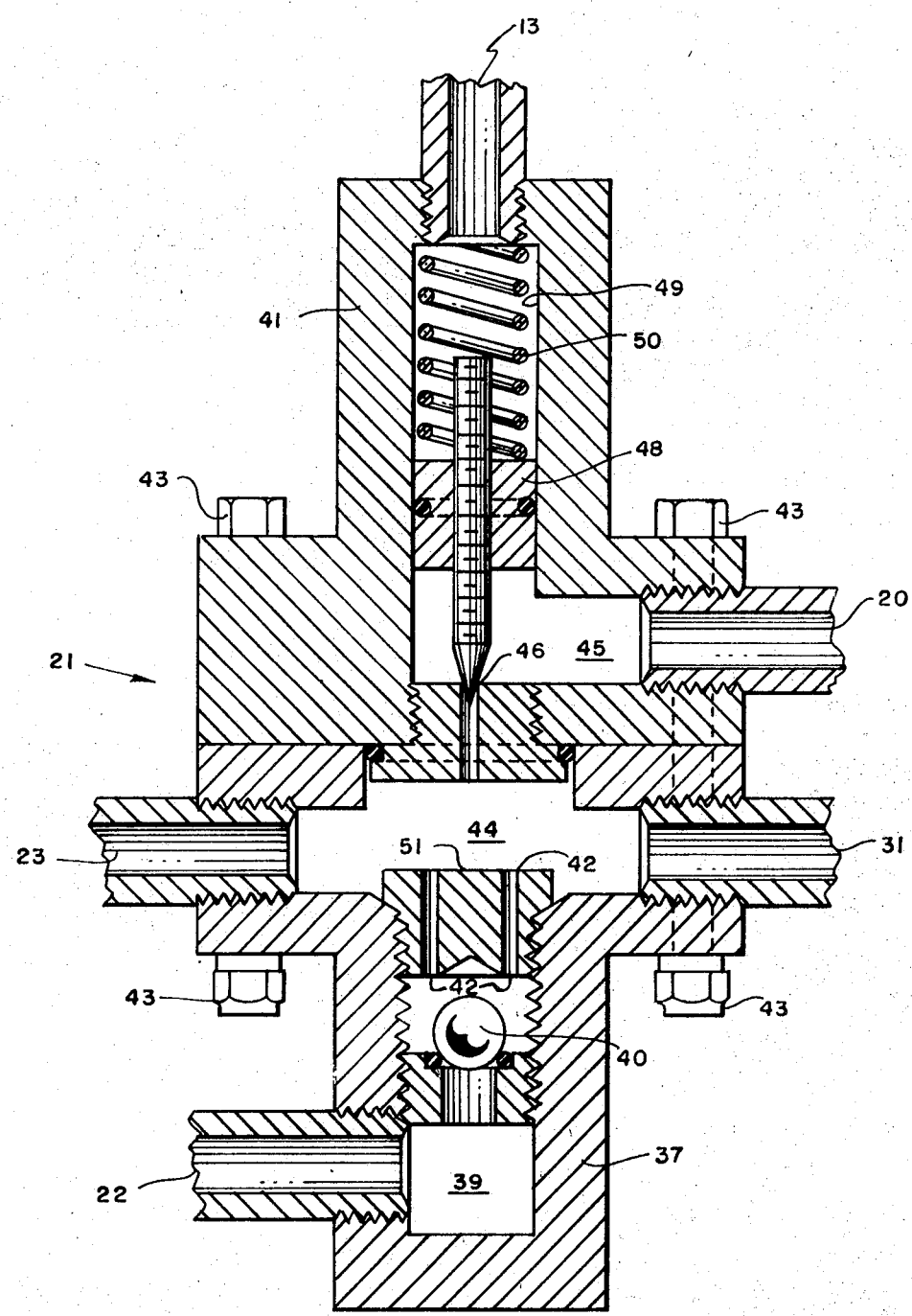
FIG. 4 is a sectional view of the air-fuel mixing valve.

Fuel is pumped through line 20 to a mixing valve 21, which is shown in detail in FIG. 4. Valve 21 is actually positioned in an upright position, as seen in FIG. 4, rather than as illustrated in FIG. 1. Idle air entering line 22 is mixed with the fuel entering line 20 and passed out through line 23 to the intake manifold 24 of the engine. Under idle conditions the partially atomized fuel in line 23 passes through an orifice 25 approximate the intake valve 26 of one of the engine's cylinders 28. While the butterfly valve 33 is essentially closed at idle, a small amount of air leaks past the valve and mixes with the atomized fuel being injected from orifice 25. Located adjacent the other cylinder intake valves, not shown in the drawing, are orifices similar to orifice 25. Line 31, partially shown, would connect to one of the above-mentioned cylinders, not shown. Rather than individual orifices for each cylinder, a single injection point for each bank of cylinders can be used or a single injection point for the entire engine.

The foot-operated throttle 32 is mechanically connected to a butterfly valve 33 in the air intake manifold 24. Any movement of foot throttle 32 sends an electrical signal to the control unit 10. A pressure sensor 34 positioned in the intake manifold 24 downstream from valve 33, sends a signal to the control unit 10 under certain conditions described hereafter. Exhaust gas temperature sensing unit 36, which is the primary sensor, supplies a signal to control unit 10 the unit 36 can be a platinum resistance element with a time response of 0.3 seconds, or a thermocouple type element with an even shorter time response. The idle adjust resistor 38, which is preset, maintains a minimum signal to the control unit 10 on the same circuit as sensor 36.

FIG. 4 is a longitudinal section of the mixing valve 21, referred to in FIG. 1. The valve is made up of a lower section 37 connected to an upper section 41 by a plurality of bolts 43. Entering the lower chamber 39 of the valve, is idle air line 22. When there is a negative pressure in chamber 44, air is drawn through air filter 30 (FIG. 1), flowing around ball check valve 40 and through orifices 42. Whenever there is a positive pressure in chamber 44, the ball check seats and prevents fuel from passing through line 22. Fuel enters the mixing valve upper chamber 45 through line 20, which is connected to the discharge side of variable flow pump 14. The fuel flow into the mixing chamber 44 is controlled by needle valve 46, which is in turn connected to servo piston 48. The chamber 49, located on the opposite side of piston 48 is connected to the constant system pressure of pump 17 (FIG. 1), through sensing line 13. The needle valve 46 will not open until pump 14 begins to discharge and the force caused by the pressure in chamber 45 exceeds the combined force of the spring 50 and the system pressure in chamber 49.

Under engine idle conditions, needle valve 46 is partially open, and fuel flows into the mixing chamber 44, impinging against orifice plug 51. The vacuum in the intake manifold 24 causes air to be sucked into chamber 44 through a plurality of radially spaced orifices 42. This causes the impacting fuel to break up into a fine atomized spray. The atomized vapor is drawn out through lines 23 and 31 at a high velocity to the intake manifold 24 of the engine. Due to the velocity through lines 23 and 31 there is very little condensation of the fuel. When the needle valve 46 is fully open and a substantial amount of fuel is flowing into chamber 44, the airflow into the chamber 44 stops due to the lack of negative pressure, and solid fuel flows out of lines 23 and 31. Under increased throttle settings of this nature, the mixing of air and fuel is done as the fuel passes through orifice 25 into the intake manifold.

OPERATION

Figure 2:
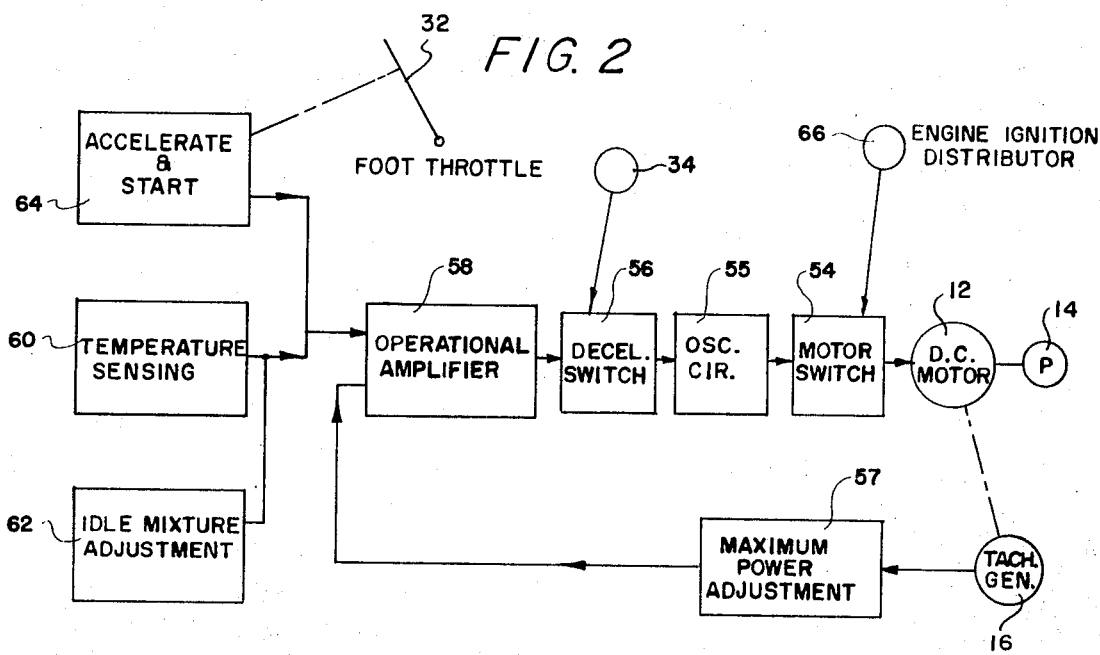
FIG. 2 is a block diagram of the injection system.

In describing the functional operation of the fuel injection system, reference is made to the block diagram of FIG. 2.

The positive displacement pump 14, driven by a DC motor 12, provides variable fuel flow to maintain the desired air-to-fuel ratio for optimum engine power. Fuel demands depend upon conditions of engine start, idle, acceleration, deceleration, and exhaust gas temperature, to vary the operation of the pump motor 12.

Motor operation is controlled by an electronic switch 54 illustrated by a block in the diagram. The switch turns on and off for very short periods of time at idle, increasing the time interval as the throttle is opened to a point where direct current is fed to motor 12. The oscillator circuit 55 provides the signal which turns the motor switch 54 off and on.

The deceleration switch 56 receives a signal from the manifold pressure sensor 34 mentioned in FIG. 1, which opens when the engine decelerates, stopping the fuel flow by preventing motor switch 54 from opening.

A tachometer-generator 16 is mechanically connected to the motor 12 to provide a feedback signal representative of the motor speed or rate of fuel flow. The feedback signal is limited by a potentiometer 57 which governs the maximum signal which the tachometer-generator 16 can send to the operational amplifier 58.

The amplifier 58 receives direct current signals from temperature sensing block 60, idle mixture adjustment block 62 and accelerate/start block 64.

The amplifier 58, performing a summation/subtraction function, acts as a voltage comparator for the signal fed back from the tachometer-generator 16 and the combined signal supplied from the above mentioned three signals from blocks 60, 62 and 64.

With the engine in idle condition, the signal received by the amplifier 58 is obtained almost entirely from blocks 60 and 62. For maximum power, the signal from block 60 is reduced by the signal from block 57 which is proportional to the speed of motor 12.

The foot throttle 32 operates the accelerate and start control block 64 and is also mechanically linked to the butterfly valve 33 in FIG. 1. A signal is obtained from block 64 only when the foot throttle setting is changed. If the throttle 32 is moved for increased power, a positive signal is emitted from block 64. If there is a decrease in power, the signal is negative. For starting the engine, a movement of the foot throttle creates a signal which through blocks 58, 56, 55 and 54 causes motor 12 to pump fuel to the engine before the exhaust gas temperature 60 is high enough to provide a signal. A signal from the engine ignition distributor 66 acts to turn off the motor switch 54 within 0.5 seconds, if there is no ignition pulse present. This prevents flooding and fuel flow when not needed.

Figure 3:
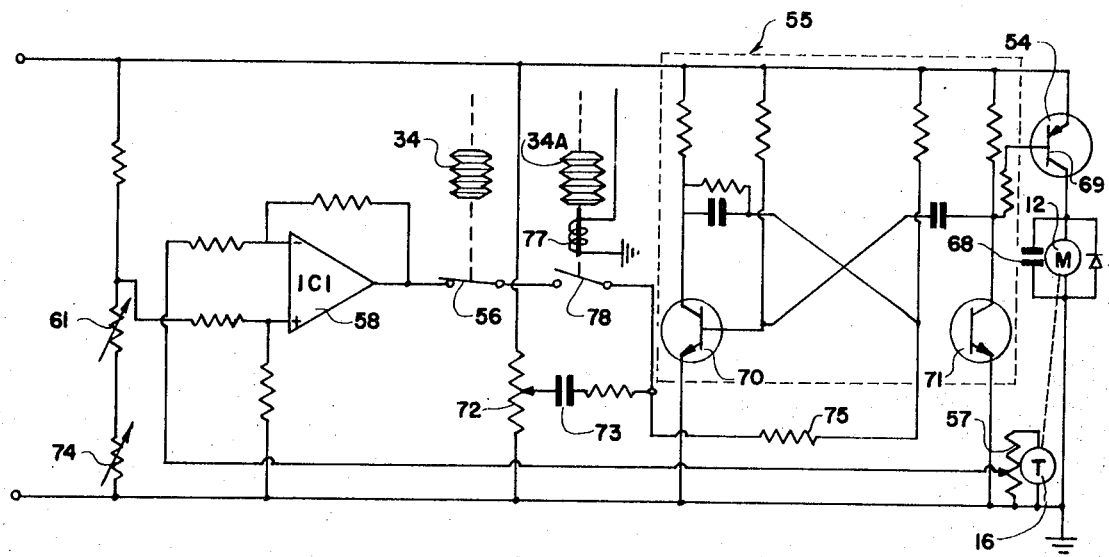
FIG. 3 is a circuit diagram of the electronic control unit.

By way of example, the system could have a circuit such as that shown in FIG. 3. The motor switch 54 would be a PNP-silicon transistor. A capacitor-diode suppression network 68, connected across the motor 12, protects the switch 54 from back EMF generated by the motor when the switch 54 is turned off. The frequency of switch operation, from approximately 100 times per second at idle to constant conduction during acceleration, is controlled by the amount of current applied to the base 69 of the transistor 54 by an oscillator circuit 55, circumscribed by dotted line.

A tachometer-generator 16 is mechanically coupled to the pump motor 12 to provide a feedback signal representative of the motor speed. The generator 16 is loaded by a potentiometer 57 adjusted to control maximum power output signal. The signal developed across the potentiometer 57 is used as an input to the operational amplifier 58.

The oscillator circuit consisting of two NPN-silicon transistors 70 and 71 connected as a relaxation oscillator, drives the transistor motor switch 54. A signal, which varies between ground and positive potential is applied to the base of the output transistor 71 of the network to vary the operating frequency of the oscillator and the conduction period of the output transistor 71. The voltage potential obtained at the collector of this transistor 71 during conduction, develops the signal for control of the motor switch 54.

An operational amplifier 58 is composed of one integrated circuit providing high gain amplification of the DC signal supplied to the oscillator.

Exhaust gas temperature is sensed by a transducer 61 presenting one leg of the divider network with a variable resistance proportional to the temperature. A potentiometer 72 mechanically connected to the accelerator linkage and capacitively coupled to the output transistor 71 provides a delta current flow through the network for any change in throttle position. Input to the divider is through a variable resistor 74 to allow setting of a minimum signal level for engine idle adjustment. Throttle movement changes the potential applied to the coupling capacitor 73 developing a signal across biasing resistor 75 and applying a potential to the base of output transistor 71 which in turn controls the motor switch 54. As the engine exhaust gas temperature increases, the voltage divider network is altered by the change in resistance of the transducer 60 to increase the signal level applied to the input of the operational amplifier 58, resulting in increased motor operation and corresponding increase of fuel flow. The deceleration switch 56, which is normally closed, will open at a high negative manifold pressure, preventing motor switch 54 from closing and allowing fuel to flow. Solenoid 77, connected in parallel to the starter will close switch 78, as long as the starter is energized. Pressure sensor 34a will hold switch 78 closed as long as the engine is running and there is any manifold vacuum pressure. When the ignition switch, not shown, is turned off, switch 78 will also open.

It should be understood that various other circuits and components could be used within the scope of the present invention to achieve an injected fuel system utilizing EGT as a primary control. As for example, in place of the variable flow pump 14, sequentially timed injectors, as previously mentioned, could be used to meter the fuel.

Having described the invention with sufficient clarity to enable those familiar with this art to construct and use systems embodying the invention, I claim:

1. A fuel injection control system for an internal combustion engine having an intake and exhaust manifold comprising:
   a fuel supply means;
   a positive displacement variable flow pump means connected to the fuel supply means;
   a variable speed motor means connected to the pump means to control the rate of fuel flow to the intake manifold of the engine;
   first sensing means which acts as the primary control, except under acceleration and deceleration conditions, positioned in the exhaust gas manifold measuring the exhaust gas temperature in time intervals of less than 0.5 seconds;
   second sensing means attached to the motor means for measuring the flow rate of fuel;
   third sensing means connected to the foot throttle of the engine for signalling any rapid acceleration and deceleration movement of the engine throttle; and
   computer means, responsive to signals received from the first, second and third sensing means which analyzes and integrates said signals to provide an output signal for controlling the motor means whereby the optimum air-to-fuel ratio is maintained in the engine under various temperature, load and speed conditions.

2. A fuel injection control system as set forth in claim 1, wherein the second sensing means includes a tachometer-generator providing a feedback signal, the computer means compares the feedback signal with the signal received from the first sensing means producing a resultant signal which calls for increase or decrease of fuel flow.

3. A fuel injection control system as set forth in claim 1, wherein the second sensing means includes a tachometer-generator producing a feedback signal, the computer means compares the feedback signal from the combined signals received from first and third sensing means, producing a resultant signal which calls for an increase or decrease of fuel flow.

4. A fuel injection control system as set forth in claim 1, including an idle mixture control which generates a signal additive with the signal from the first sensing means, said control is preset at a level to control the fuel flow under idle conditions.

5. A fuel injection control system as set forth in claim 1, wherein the second sensing means includes a tachometer-generator producing a feedback signal, the computer means compares the feedback signal from the combined signals received from first and third sensing means, producing a resultant signal which calls for an increase or decrease of fuel flow, fourth sensing means positioned in the intake manifold to sense manifold pressure, and deceleration switch means controlling the power input to the motor means, the switch means being activated by the fourth sensing means under a deceleration condition to stop the fuel flow to the engine.

6. A fuel injection control system for an internal combustion engine having an intake and exhaust gas manifold comprising:
a fuel supply maintained at a constant system pressure;
a positive displacement variable flow pump connected to the fuel supply;
a variable speed motor connected in driving relation to the pump;
first sensing means positioned in the exhaust gas manifold for measuring instantaneously exhaust gas temperature;
second sensing means attached to the variable speed motor for measuring the flow rate of the pump;
third sensing means connected to the foot throttle of the engine which signals any movement of the engine throttle; and
a computer means responsive to signals received from the first, second and third sensing means, which analyzes and integrates said signals to provide an output signal to the pump motor for varying the fuel flow rate whereby the optimum air-to-fuel ratio is maintained in the engine under various temperature, load and speed conditions.

7. A fuel injection control system as set forth in claim 6, including an orifice means positioned in the intake manifold of the engine and duct means providing passage of fuel between the discharge side of the pump and the orifice means.

8. A fuel injection control system as set forth in claim 6, including an orifice means positioned in the intake manifold of the engine having a plurality of orifices each being positioned in close proximity with the intake valve of each cylinder, and duct means providing passage of fuel between the discharge side of the pump and the orifice means.

9. A fuel injection control system as set forth in claim 6, including an orifice means positioned in the intake manifold of the engine and duct means providing passage of fuel between the discharge side of the pump and the orifice means, and a mixing valve means positioned in the duct means which allows air to mix with the fuel entering the mixing valve only at idle condition with minimum fuel flow whereby improved atomization is achieved at idle conditions.

10. A fuel injection control system as set forth in claim 6, including an orifice means positioned in the intake manifold of the engine and duct means providing passage of fuel between the discharge side of the pump and the orifice means, and a mixing valve means positioned in the duct means having a mixing chamber with inlet and discharge passages, a high-velocity stream of fuel entering the chamber through the inlet passage, a static air line connected with the chamber, a check valve positioned in air line only allowing flow into the mixing chamber, said orifice means being of such a size that the vacuum from the intake manifold is of sufficient pressure in the mixing chamber to draw air into the mixing chamber when fuel flow into the chamber is at a low rate but not sufficient to maintain a vacuum at a higher fuel flow rate.

11. A fuel injection control system as set forth in claim 1, wherein the third sensing means produces a positive signal when the engine throttle accelerates and a negative signal when it decelerates, the second sensing means includes a tachometer-generator producing a feedback signal, the computer means compares the feedback signal with the combined signals received from first and third sensing means, producing a resultant signal which calls for an increase or decrease of fuel flow.

* * * * *